(12) United States Patent
Sasaki et al.

(10) Patent No.: US 12,506,149 B2
(45) Date of Patent: Dec. 23, 2025

(54) SECONDARY BATTERY

(71) Applicant: Vehicle Energy Japan Inc., Hitachinaka (JP)

(72) Inventors: Hironori Sasaki, Hitachinaka (JP); Toshiyuki Ariga, Hitachinaka (JP); Takeshi Miki, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 69 days.

(21) Appl. No.: 16/333,851

(22) PCT Filed: Dec. 21, 2017

(86) PCT No.: PCT/JP2017/045870
§ 371 (c)(1),
(2) Date: Mar. 15, 2019

(87) PCT Pub. No.: WO2018/123792
PCT Pub. Date: Jul. 5, 2018

(65) Prior Publication Data
US 2019/0267624 A1    Aug. 29, 2019

(30) Foreign Application Priority Data

Dec. 28, 2016 (JP) .................................. 2016-254649

(51) Int. Cl.
*H01M 4/587*    (2010.01)
*H01M 4/36*    (2006.01)
(Continued)

(52) U.S. Cl.
CPC ............. *H01M 4/587* (2013.01); *H01M 4/36* (2013.01); *H01M 4/62* (2013.01); *H01M 4/625* (2013.01); *H01M 10/052* (2013.01)

(58) Field of Classification Search
CPC .............................. H01M 4/587; H01M 4/625
See application file for complete search history.

(56) References Cited

U.S. PATENT DOCUMENTS

2006/0127771 A1\* 6/2006 Yamaki ................. H01M 4/485
429/231.8
2009/0286153 A1\* 11/2009 He ..................... H01M 10/0585
429/185

(Continued)

FOREIGN PATENT DOCUMENTS

CN    104377328 A    2/2015
CN    104380505 A    2/2015
(Continued)

OTHER PUBLICATIONS

Extended European Search Report issued in European Application No. 17885784.3 dated Sep. 1, 2020 (seven (7) pages).
(Continued)

*Primary Examiner* — Matthew J Merkling
(74) *Attorney, Agent, or Firm* — Crowell & Moring LLP

(57) ABSTRACT

A conventional secondary battery has a problem that an internal resistance is very high in a low SOC region and necessary output cannot be taken out. In a secondary battery including a positive electrode and a negative electrode, a capacity difference from a terminal potential of a positive electrode discharge curve to a terminal voltage of a battery discharge curve of the secondary battery with respect to a discharge capacity of the secondary battery is 14% to 26%.

10 Claims, 6 Drawing Sheets

(51) Int. Cl.
*H01M 4/62* (2006.01)
*H01M 10/052* (2010.01)

(56) References Cited

U.S. PATENT DOCUMENTS

| | | | | |
|---|---|---|---|---|
| 2011/0052972 A1* | 3/2011 | Sohn | ................ | H01M 10/4235 29/623.5 |
| 2013/0089766 A1* | 4/2013 | Sasaki | ............... | H01M 10/0431 429/94 |
| 2014/0023921 A1* | 1/2014 | Lee | ...................... | H01M 4/366 427/126.6 |
| 2014/0045011 A1 | 2/2014 | Yamami et al. | | |
| 2014/0291588 A1 | 10/2014 | Oh et al. | | |
| 2015/0050544 A1 | 2/2015 | Nam et al. | | |
| 2015/0064559 A1 | 3/2015 | Oono et al. | | |
| 2015/0118542 A1* | 4/2015 | Lee | .................... | H01M 4/5825 429/156 |
| 2015/0140446 A1* | 5/2015 | Li | ...................... | H01M 10/052 429/199 |
| 2015/0188107 A1* | 7/2015 | Sugii | ................. | H01M 10/0525 429/145 |
| 2016/0197340 A1 | 7/2016 | Lee et al. | | |
| 2016/0372798 A1 | 12/2016 | Ishii | | |
| 2016/0375790 A1* | 12/2016 | Komiyama | ............. | B60L 58/12 320/136 |
| 2017/0040647 A1* | 2/2017 | Jang | ................. | H01M 10/4235 |
| 2018/0254525 A1* | 9/2018 | Xia | ................... | H01M 10/0525 |
| 2019/0013523 A1* | 1/2019 | Shibuya | ................. | H01M 4/13 |

FOREIGN PATENT DOCUMENTS

| | | |
|---|---|---|
| CN | 105359308 A | 2/2016 |
| CN | 105474449 A | 4/2016 |
| EP | 2 806 485 A1 | 11/2014 |
| JP | 2014-35922 A | 2/2014 |
| JP | 2015-11930 A | 1/2015 |
| JP | 2016-528706 A | 9/2016 |

OTHER PUBLICATIONS

Japanese-language Office Action issued in Japanese Application No. 2018-559111 dated Mar. 10, 2020 with English translation (10 pages).
International Search Report (PCT/ISA/210) issued in PCT Application No. PCT/JP2017/045870 dated Mar. 6, 2018 with English translation (five (5) pages).
Japanese-language Written Opinion (PCT/ISA/237) issued in PCT Application No. PCT/JP2017/045870 dated Mar. 6, 2018 (five (5) pages).
Chinese-language Office Action issued in Chinese Application No. 201780057286.9 dated Oct. 26, 2021 (six (6) pages).
European Office Action issued in European Application No. 17 885 784.3 dated Jul. 28, 2022 (four (4) pages).

* cited by examiner

FIG. 6

| No. | Cap.b / Cap.a (%) | SOC:20%DCR (%, vs. COMPARATIVE EXAMPLE) | BATTERY CAPACITY (%, vs. COMPARATIVE EXAMPLE) |
|---|---|---|---|
| COMPARATIVE EXAMPLE | 12 | 100 | 100 |
| EXAMPLE 1 | 14 | 74 | 98 |
| EXAMPLE 2 | 17 | 47 | 95 |
| EXAMPLE 3 | 19 | 45 | 93 |
| EXAMPLE 4 | 22 | 43 | 89 |
| EXAMPLE 5 | 25 | 42 | 87 |
| EXAMPLE 6 | 26 | 42 | 86 |

SECONDARY BATTERY

TECHNICAL FIELD

The present invention relates to a secondary battery including a positive electrode and a negative electrode.

BACKGROUND ART

As the background art of the present technical field, there is JP 2015-11930 A (PTL 1). This publication provides a nonaqueous electrolyte secondary battery that can achieve both input and output characteristics in a wide SOC region (particularly a low SOC region) and durability at a high level. Specifically, an electrode body, which includes a positive electrode having a positive electrode active material and a negative electrode having a negative electrode active material, and a nonaqueous electrolyte are housed in a battery case. The negative electrode unit irreversible capacity per one gram of the negative electrode active material is 20 mAh/g or more and 35 mAh/g or less. The negative electrode irreversible capacity Ua (mAh), which is calculated by the product of the negative electrode unit irreversible capacity per one gram of the negative electrode active material (mAh/g). and the mass (g) of the negative electrode active material, and the positive electrode irreversible capacity Uc (mAh), which is calculated by the product of the positive electrode unit irreversible capacity per one gram of the positive electrode active material (mAh/g) and the mass (g) of the negative electrode active material, satisfy a relationship of Uc<Ua.

CITATION LIST

Patent Literature

PTL 1: JP 2015-11930 A

SUMMARY OF INVENTION

Technical Problem

For example, in a hybrid vehicle equipped with a lithium secondary battery, when an engine is started, it is often assumed that a large current discharge occurs in a low state-of-charge (SOC) region. However, an internal resistance of a lithium secondary battery is extremely high in a low SOC region (for example, a region of SOC 20% to 30%), and there is a possibility that required output characteristics cannot be taken out.

With respect to such a problem, in PTL 1, the main factor of the increase in internal resistance in the low SOC region is the positive electrode, and in the low SOC region (the end of discharge), it is caused by a sharp drop in positive electrode potential. Therefore, it is said that since the positive electrode potential can be kept high even in the low SOC region by shifting the potential range (operating potential) of the positive electrode used as the battery to the high potential side, the internal resistance can be reduced. Specifically, there is proposed a secondary battery in which a negative electrode irreversible capacity is made larger than a positive electrode irreversible capacity.

However, in PTL 1, while it is said that an effect can be obtained by making the negative electrode irreversible capacity Ua larger than the positive electrode irreversible capacity Uc, if the difference between Ua and Uc is small, the effect is hardly obtained, and even if the difference between Ua and Uc is large, the capacity of the secondary battery is reduced. Therefore, it is considered that there is an appropriate value.

Solution to Problem

Although the present application includes a plurality of means for solving the above-mentioned problems, as one example thereof, a secondary battery includes a positive electrode and a negative electrode, wherein a capacity difference from a terminal potential of a positive electrode discharge curve to a terminal voltage of a battery discharge curve of the secondary battery with respect to a discharge capacity of the secondary battery is 14% to 26%.

Advantageous Effects of Invention

It is possible to reduce an internal resistance in a low SOC region of a secondary battery, without impairing the capacity of the secondary battery, by shifting a potential range (operating potential) of a positive electrode to the high potential side so that a capacity difference from a terminal potential of a positive electrode discharge curve to a terminal voltage of a battery discharge curve of the secondary battery with respect to a discharge capacity of the secondary battery is 14% to 26%. Therefore, since a use SOC range of the secondary battery can be expanded, the energy density of the secondary battery can be improved.

BRIEF DESCRIPTION OF DRAWINGS

FIG. 6 is a diagram showing results of Examples of the present invention and Comparative Example.

DESCRIPTION OF EMBODIMENTS

Embodiment 1

Figure 1:
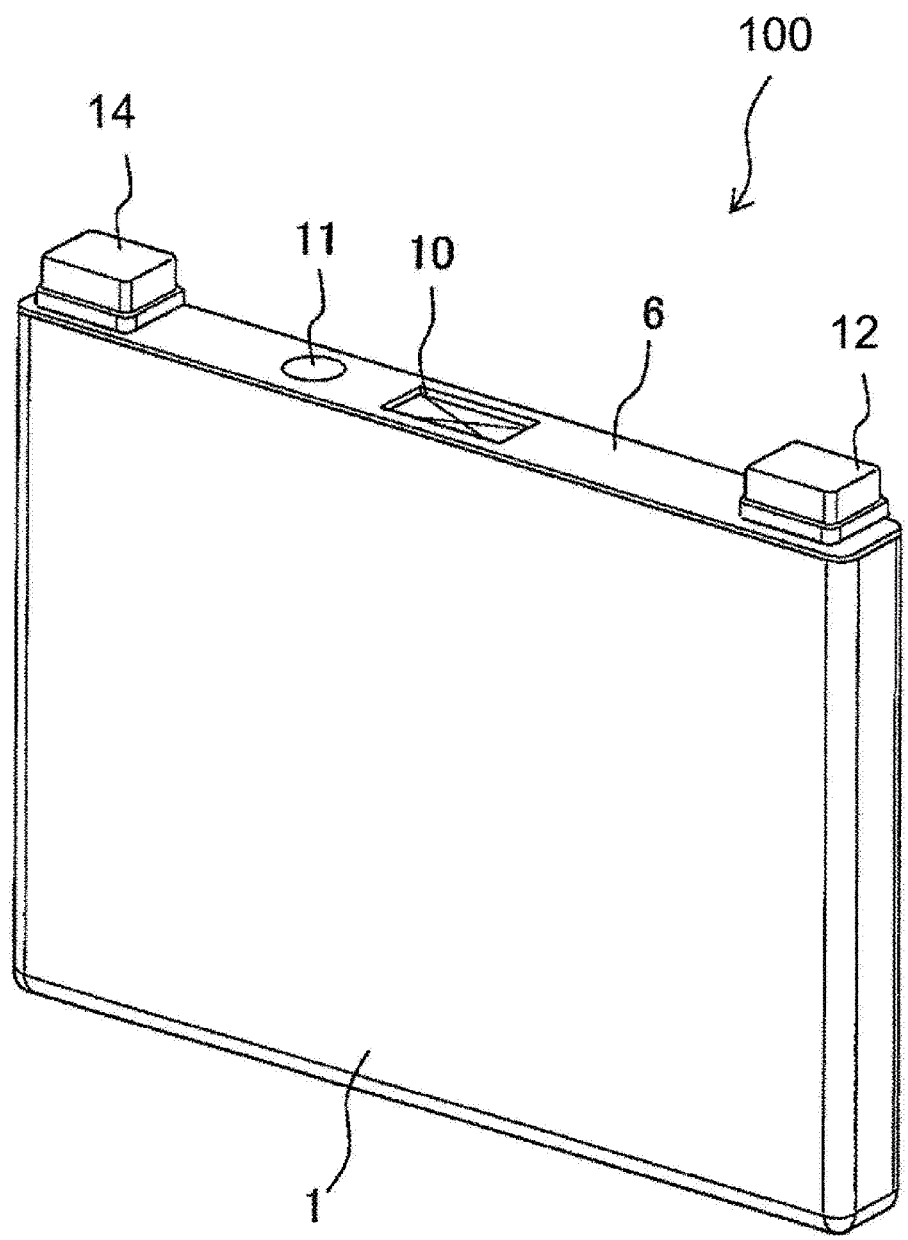
FIG. 1 is an external perspective view of a rectangular secondary battery.

Hereinafter, embodiments of the present invention will be described with reference to the drawings or the like. The following descriptions show a specific example of the contents of the present invention, and the present invention is not limited to these descriptions. Various changes and modifications can be made by those skilled in the art within the scope of the technical idea disclosed in this specification. In addition, in all the drawings for explaining the present invention, those having the same function are denoted by the same reference numerals, and the redundant description thereof may be omitted.

FIG. 1 is an external perspective view of a flat wound secondary battery.

The flat wound secondary battery 100 includes a battery can 1 and a lid (battery lid) 6. The battery can 1 has side surfaces and a bottom surface 1*d* and has an opening portion 1a thereabove, with the side surfaces having a pair of opposite wide side surfaces 1b having a relatively large area and a pair of opposite narrow side surfaces 1c having a relatively small area.

A winding group 3 is accommodated in the battery can 1, and the opening portion 1a of the battery can 1 is sealed by the battery lid 6. The battery lid 6 has a substantially rectangular flat plate shape, and the battery can 1 is welded and sealed so as to close the upper opening portion 1a of the battery can 1. The battery lid 6 is provided with a positive electrode external terminal 14 and a negative electrode external terminal 12. The winding group 3 is charged via the positive electrode external terminal 14 and the negative electrode external terminal 12, and power is supplied to an external load. A gas discharge valve 10 is integrally provided in the battery lid 6, and when the pressure in the battery container increases, the gas discharge valve 10 opens such that gas is discharged from the inside to reduce the pressure inside the battery container. Therefore, the safety of the flat wound secondary battery 100 is secured.

Figure 2:
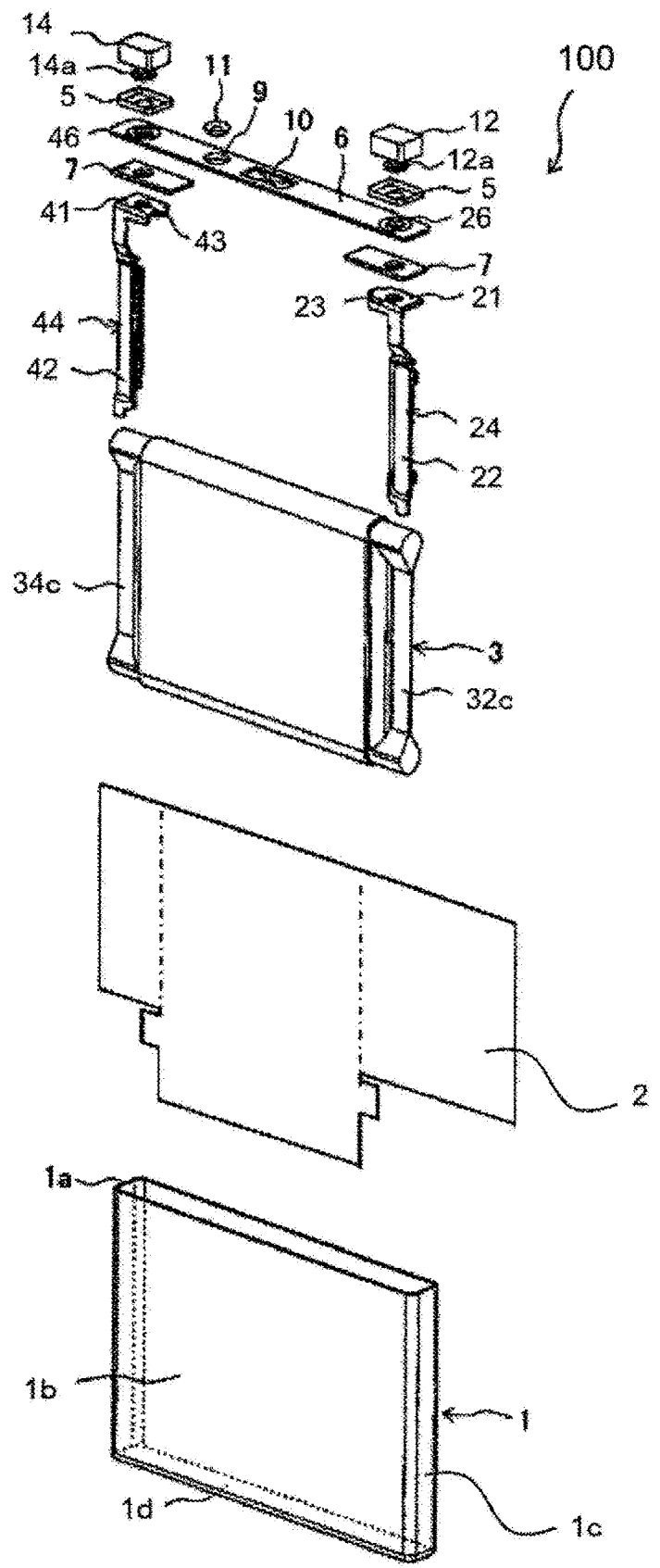
FIG. 2 is an exploded perspective view of the rectangular secondary battery.

FIG. 2 is an exploded perspective view of a rectangular secondary battery.

The battery can 1 of the flat wound secondary battery 100 has a rectangular bottom surface 1d, rectangular tubular side surfaces 1b and 1c rising from the bottom surface 1d, and an opening portion 1a opening upward at the upper ends of the side surfaces 1b and 1c. In the battery can 1, the winding group 3 is accommodated via an insulating protective film 2.

Since the winding group 3 is wound in a flat shape, the winding group 3 has a pair of opposite curved portions having a semicircular cross section, and a flat portion continuously formed between the pair of curved portions. The winding group 3 is inserted into the battery can 1 from one curved portion side such that the winding axis direction is along the lateral width direction of the battery can 1, and the other curved portion side is disposed at the upper opening side.

A positive electrode foil exposed portion 34c of the winding group 3 is electrically connected to the positive electrode external terminal 14 provided on the battery lid 6 via a positive electrode current collecting plate (current collecting terminal) 44. In addition, a negative electrode foil exposed portion 32c of the winding group 3 is electrically connected to the negative electrode external terminal 12 provided on the battery lid 6 via a negative electrode current collecting plate (current collecting terminal) 24. Therefore, power is supplied from the winding group 3 to the external load via the positive electrode current collecting plate 44 and the negative electrode current collecting plate 24, and externally generated power is supplied to the winding group 3 via the positive electrode current collecting plate 44 and the negative electrode current collecting plate 24, thereby achieving the charge.

A gasket 5 and an insulating plate 7 are provided at the battery lid 6 so as to respectively electrically insulate the positive electrode current collecting plate 44 and the negative electrode current collecting plate 24, and the positive electrode external terminal 14 and the negative electrode external terminal 12 from the battery lid 6. In addition, after an electrolytic solution is injected into the battery can 1 from a liquid injection port 9, the liquid injection port 9 is sealed by bonding a liquid injection plug 11 to the battery lid 6 through laser welding, and the flat wound secondary battery 100 is sealed.

Here, examples of materials for forming the positive electrode external terminal 14 and the positive electrode current collecting plate 44 include an aluminum alloy, and examples of materials for forming the negative electrode external terminal 12 and the negative electrode current collecting plate 24 include a copper alloy. In addition, examples of materials for forming the insulating plate 7 and the gasket 5 include insulating resin materials such as polybutylene terephthalate, polyphenylene sulfide, and perfluoroalkoxy fluorine resins.

A liquid injection port 9 for injecting the electrolytic solution into the battery container is drilled in the battery lid 6, and the liquid injection port 9 is sealed by the liquid injection plug 11 after the electrolytic solution is injected into the battery container. Here, as the electrolytic solution to be injected into the battery container, for example, a nonaqueous electrolytic solution in which a lithium salt such as lithium hexafluorophosphate ($LiPF_6$) is dissolved in a carbonate ester-based organic solvent such as ethylene carbonate can be applied.

The positive electrode external terminal 14 and the negative electrode external terminal 12 have welded bonding portions welded and bonded to a busbar or the like. The welded bonding portion has a rectangular parallelepiped block shape protruding upward from the battery lid 6. The welded bonding portion has a structure in which the lower surface thereof faces the surface of the battery lid 6, and the upper surface thereof is parallel to the battery lid 6 at a predetermined height position.

A positive electrode connecting portion 14a and a negative electrode connecting portion 12a protrude from the lower surfaces of the positive electrode external terminal 14 and the negative electrode external terminal 12, respectively, and the tips thereof have a cylindrical shape that can be inserted into a positive electrode side through-hole 46 and a negative electrode side through-hole 26 of the battery lid 6, respectively. The positive electrode connecting portion 14a and the negative electrode connecting portion 12a penetrate through the battery lid 6 and protrude toward the inside of the battery can 1 from a positive electrode current collecting plate base portion 41 and a negative electrode current collecting plate base portion 21 of the positive electrode current collecting plate 44 and the negative electrode current collecting plate 24, the tips thereof are crimped, and the positive electrode external terminal 14 and the negative electrode external terminal 12, and the positive electrode current collecting plate 44 and the negative electrode current collecting plate 24 are integrally fixed to the battery lid 6. The gasket 5 is interposed between the positive electrode external terminal 14 and the negative electrode external terminal 12, and the battery lid 6. The insulating plate 7 is interposed between the positive electrode current collecting plate 44 and the negative electrode current collecting plate 24, and the battery lid 6.

The positive electrode current collecting plate 44 and the negative electrode current collecting plate 24 respectively include: the positive electrode current collecting plate base portion 41 and the negative electrode current collecting plate base portion 21 having a rectangular shape and arranged to face the lower surface of the battery lid 6; and a positive electrode side connection end portion 42 and a negative electrode side connection end portion 22 bent at the side ends of the positive electrode current collecting plate base portion 41 and the negative electrode current collecting plate base portion 21, extending toward the bottom surface side along the wide surface of the battery can 1, and connected so as to face the positive electrode foil exposed portion 34c and the negative electrode foil exposed portion 32c of the winding group 3 in an overlapped state. A positive electrode side opening hole 43 and a negative electrode side opening hole 23, into which the positive electrode connecting portion 14a and the negative electrode connecting portion 12a are inserted, are respectively formed in the positive electrode current collecting plate base portion 41 and the negative electrode current collecting plate base portion 21.

The insulating protective film 2 is wrapped around the winding group 3 with the direction along the flat surface of the winding group 3 and the direction orthogonal to the winding axis direction of the winding group 3 as the central axis direction. The insulating protective film 2 is made of one sheet of a synthetic resin such as PP (polypropylene) or a plurality of film members, and has a length that can be wound with the direction parallel to the flat surface of the winding group 3 and the direction orthogonal to the winding axis direction as the winding center.

Figure 3:
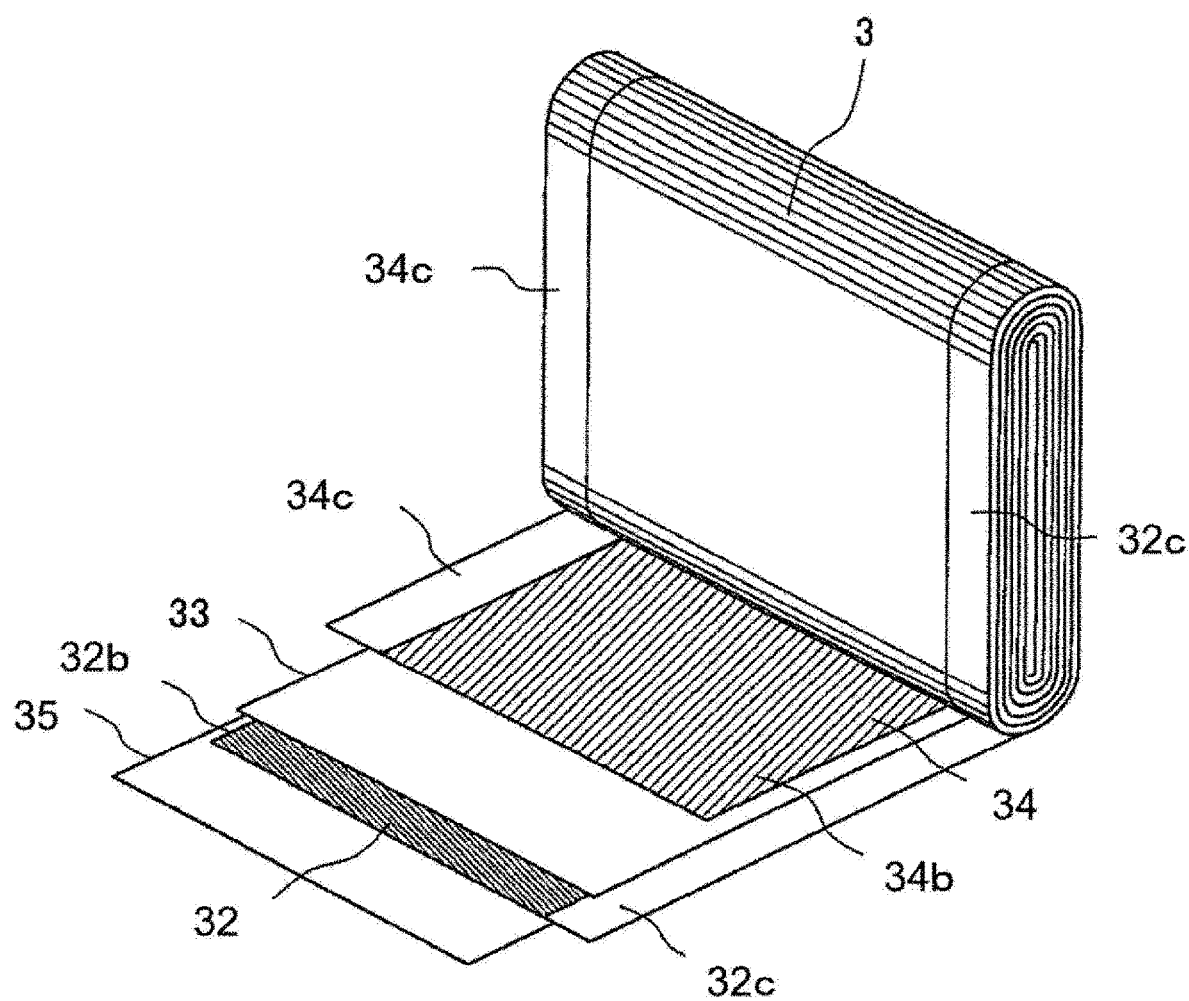
FIG. 3 is an exploded perspective view of a wound electrode group.

FIG. 3 is an exploded perspective view showing a state in which a part of an electrode winding group is unrolled. The winding group 3 is constructed by winding the negative electrode 32 and the positive electrode 34 in a flat shape with separators 33 and 35 interposed therebetween. In the winding group 3, the outermost electrode is the negative electrode 32, and the separators 33 and 35 are further wound on the outside thereof.

The separators 33 and 35 have an insulating function of preventing short-circuiting between the positive electrode 34 and the negative electrode 32, and have a function of holding the nonaqueous electrolyte. Preferable examples include a porous sheet made of a resin such as polyethylene (PE), polypropylene (PP), polyester, cellulose, and polyamide. The porous sheet made of a resin may have a single layer structure, and may be a plurality of layers (for example, a three-layer structure of PP/PE/PP or the like).

More preferably, a layer composed of an inorganic material (for example, alumina particles or the like) and a binder is provided on one side or both sides of the separators 33 and 35. Therefore, even when the lithium secondary battery is used in an abnormal state (for example, when the temperature of the secondary battery rises to 160° C. or more due to over-charge, crushing, etc.), it is possible to maintain the insulating function without melting and to secure safety.

A portion of the negative electrode 32 coated with a negative electrode mixture layer 32b is wider in a width direction than a portion of the positive electrode 34 coated with a positive electrode mixture layer 34b. Therefore, the portion coated with the positive electrode mixture layer 34b is configured so as to be always sandwiched between the portions coated with the negative electrode mixture layer 32b. The positive electrode foil exposed portion 34c and the negative electrode foil exposed portion 32c are bundled at a flat portion and connected by welding or the like. Although the separators 33 and 35 are wider in the width direction than the portion coated with the negative electrode mixture layer 32b, they do not interfere with bundling and welding because the positive electrode foil exposed portion 34c and the negative electrode foil exposed portion 32c are wound at positions at which metal foil surfaces of the end portions are exposed.

A slurry prepared by dispersing a negative electrode active material and a binder in an appropriate solvent (for example, water or N-methyl-2-pyrrolidone) followed by kneading is applied as the negative electrode mixture layer 32b coated on the negative electrode 32. The negative electrode 32 coated with the slurry can be prepared by removing the solvent through drying and then appropriately adjusting its thickness with a press machine.

Examples of the negative electrode active material include carbon materials such as natural graphite, artificial graphite, hardly graphitizable carbon (hard carbon), and easily graphitizable carbon (soft carbon). With regard to graphite, it is possible to prevent reaction with the electrolytic solution more than necessary by covering the surface of graphite with amorphous carbon.

In addition, in order to set, to the range of 14% to 26%, the capacity difference from the terminal potential of the positive electrode discharge curve to the terminal voltage of the battery discharge curve of the secondary battery with respect to the discharge capacity of the secondary battery, it may be considered a material obtained by mixing carbon black, such as acetylene black, ketjen black, channel black, furnace black, lamp black, and thermal black as a conductive additive to a graphite material, and a material obtained by mixing these conductive additives with the graphite material and then coating with amorphous carbon to form a composite material; and a method of mixing hardly graphitizable carbon (hard carbon), easily graphitizable carbon (soft carbon), and a metal oxide (iron oxide, copper oxide, or the like) to graphite, for example.

The positive electrode 34 has a positive electrode active material mixture on both sides of a positive electrode foil which is a positive electrode current collector, and the positive electrode foil exposed portion 34c to which the positive electrode active material mixture is not applied is provided at the end portion on one side of the positive electrode foil in the width direction.

The positive electrode active material is not particularly limited, and a material obtained by mixing one or more materials known to be applicable as the positive electrode material of the lithium secondary battery can be used. Preferable examples include a spinel type (for example, $LiMn_2O_4$ or the like), a layered type (for example, $LiCoO_2$, $LiNiO_2$), and an olivine type (for example, $LiFePO_4$ or the like). In addition, a layered lithium-nickel-cobalt-manganese composite oxide containing Li, Ni, Co, and Mn as constituent elements (for example, $LiNi_{0.33}Co_{0.3}Mn_{0.33}O_2$) has almost no change in lattice volume due to charge and discharge up to two-thirds of a lithium ion desorption amount, the layered lithium-nickel-cobalt-manganese composite oxide is also excellent in durability and can be said as a more preferable example.

The negative electrode 32 has a negative electrode active material mixture on both sides of a negative electrode foil which is a negative electrode current collector, and the negative electrode foil exposed portion 32c to which the negative electrode active material mixture is not applied is provided at the end portion on the other side of the positive electrode foil in the width direction. The positive electrode foil exposed portion 34c and the negative electrode foil exposed portion 32c are regions where the metal surface of the electrode foil is exposed and are wound so as to be disposed at positions of one side and the other side in the winding axis direction.

In addition, as a shaft center, for example, a structure formed by winding a resin sheet having higher flexural rigidity than any of the positive electrode foil 31a, the negative electrode foil 32a, and the separator 33 can be used.

Figure 4:
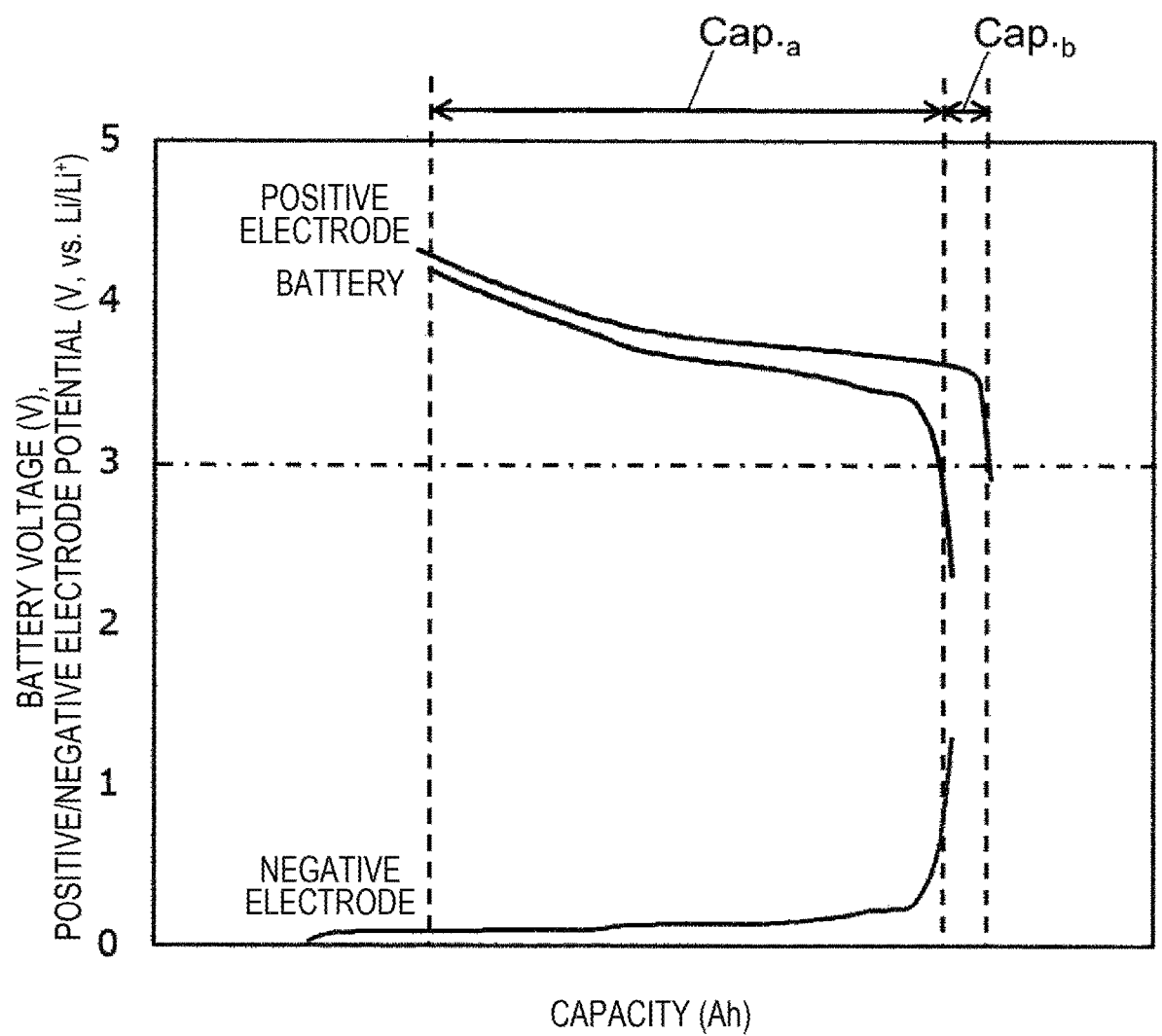
FIG. 4 is an explanatory diagram showing a relationship between a battery voltage and positive/negative electrode potential, and each capacity.

Next, the principle of a point which is the feature of the present invention will be described. FIG. 4 is an explanatory diagram showing a relationship between a battery voltage and a positive/negative electrode potential, and each capacity.

The discharge curve of the battery voltage generally shows the potential difference between the discharge curve of the positive electrode potential (vs. $Li/Li^+$) and the discharge curve of the negative electrode potential (vs. Li/Li$^+$), and FIG. 4 is a diagram showing the relationship.

Paradoxically, it is possible to estimate the discharge curve of the positive electrode potential and the discharge curve of the negative electrode potential from the discharge curve of the battery voltage.

The positive electrode potential shows the discharge curve when discharged from 4.3 V (vs. Li/Li$^+$) to 2.9 V (vs. Li/Li$^+$) with respect to the Li reference potential. The discharge current is 0.02 CA based on the battery capacity.

The negative electrode potential shows the discharge curve when discharged from 0.01V (vs. Li/Li$^+$) to 1.5 V (vs. Li/Li$^+$) with respect to the Li reference potential. The discharge current is 0.02 CA based on the battery capacity.

After the discharge curves of the positive electrode potential and the negative electrode potential are obtained, the 0.02 CA discharge curve of the battery voltage of 4.2 V to 2.9 V is obtained, and the relationship as illustrated in FIG. 4 can be obtained by fitting the discharge curve of the battery voltage with the discharge curves of the positive electrode potential and the negative electrode potential.

From FIG. 4, when the capacity of the battery whose battery voltage is in the range of 4.2 V to 3.0 V is Cap.$_a$ and the capacity difference between the positive electrode potential 3.0 V (vs. Li/Li$^+$) and the battery voltage 3.0 V is Cap.$_b$, the resistance of the lithium secondary battery in the low SOC region can be reduced by controlling the ratio of Cap.$_b$/Cap.$_a$ to an appropriate value.

Figure 5:
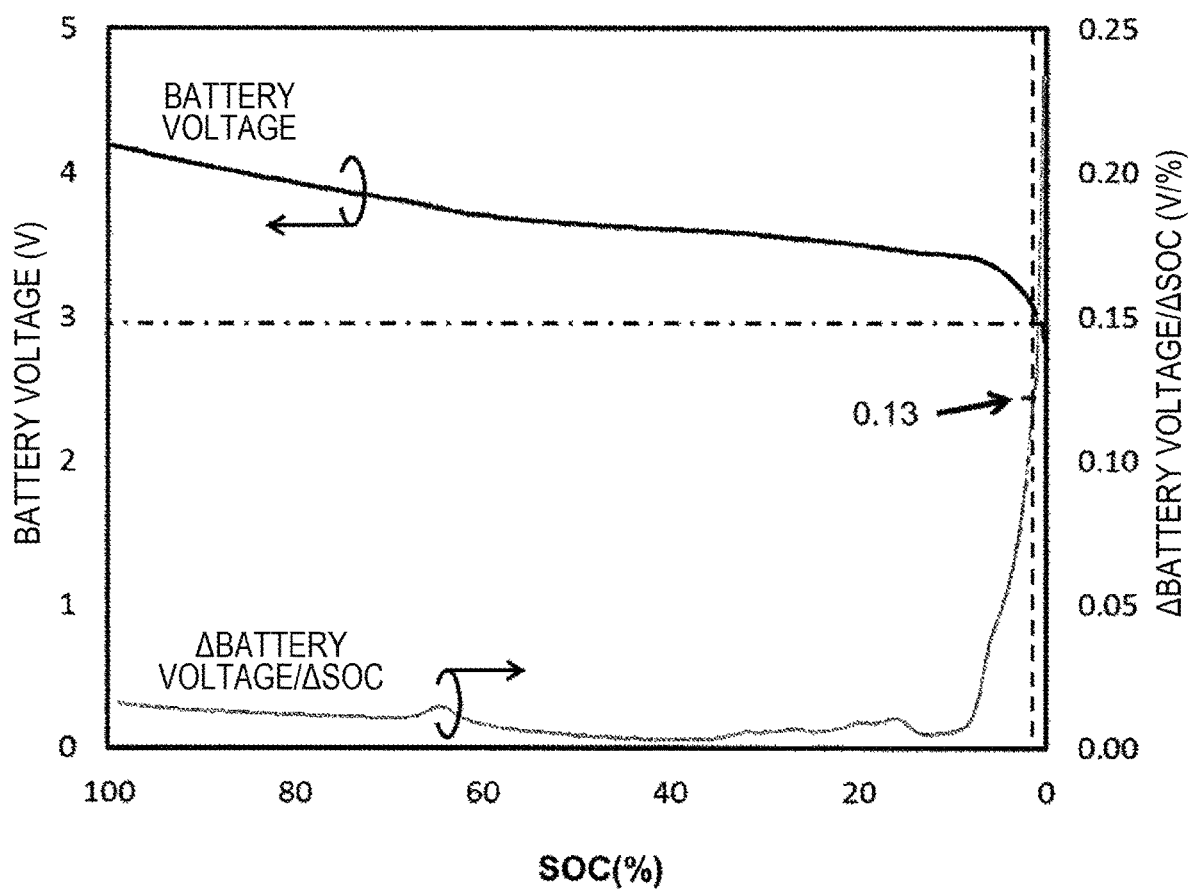
FIG. 5 is an explanatory diagram showing a relationship between an SOC and the battery voltage and a battery voltage change rate with respect to an SOC change rate (Δ(battery voltage)/ΔSOC).

FIG. 5 is an explanatory diagram showing a relationship between an SOC and the battery voltage and a battery voltage change rate with respect to an SOC change rate (Δ(battery voltage)/ΔSOC). As the terminal voltage of the battery voltage, the SOC of 3.0 V and Δ(battery voltage)/ΔSOC at that time were 0.13. That is, it can be defined that the terminal voltage is the region in which Δ(battery voltage)/ΔSOC is 0.13 or more, and similarly, the terminal potential of the positive electrode potential is the region in which Δ(positive electrode potential)/ΔSOC is 0.13 or more.

(Configuration of Lithium Secondary Battery)

First, LiNi$_{0.33}$Co$_{0.33}$Mn$_{0.33}$ powder as the positive electrode active material, acetylene black and graphite as the conductive additive, polyvinylidene fluoride (PVdF) as the binder were mixed at a weight ratio of 90:4:3:3, and the viscosity was adjusted with N-methyl-2-pyrrolidone (NMP) so that a slurry was formed. The positive electrode slurry was applied to both surfaces of an aluminum foil having a heat of 15 μm, and a positive electrode was prepared after drying and pressing.

Subsequently, spheronized natural graphite to which amorphous carbon coating was performed as the negative electrode active material in Comparative Example of Table 1, a styrene butadiene rubber (SBR) as the binder, and carboxymethyl cellulose (CMC) as the dispersant were mixed at a ratio 98:1:1, and the viscosity was adjusted with ion exchanged water so that a slurry was formed. The negative electrode slurry was applied to both surfaces of a copper foil having a thickness of 10 μm, and a negative electrode was prepared after drying and pressing.

In addition, as the negative electrode active materials of Examples 1 to 6 in Table 1, carbon black composite treated natural graphite, which was obtained by mixing spheronized natural graphite and carbon black at 98 wt %:2 wt %, composite treating the mixture, and coating with amorphous carbon, SBR, and CMC were mixed at a weight ratio of 98:1:1, and the viscosity was adjusted with ion exchanged water so that a slurry was formed. The negative electrode slurry was applied to both surfaces of a copper foil having a thickness of 10 μm, and a negative electrode was prepare after drying and pressing.

Subsequently, the separators 33 and 35 were sandwiched between the prepared positive electrode 34 and the prepared negative electrode 32. An electrode winding group 3 was prepared with the configuration as shown in FIGS. 1 to 3. A current collecting plate of a battery lid 6 and an uncoated portion of the electrode winding group 3 were welded. The electrode winding group 3 was covered with an insulating protective film 2 and sealed in a battery can 1. The battery lid 6 and the battery can 1 were welded together.

Subsequently, as a nonaqueous electrolytic solution, an electrolytic solution was prepared by dissolving LiPF$_6$ as a supporting salt at a concentration of 1.1 mol/L in a solvent in which ethylene carbonate (EC), ethyl methyl carbonate (EMC), and dimethyl carbonate (DMC) were mixed at a volume ratio of 30:30:40. The adjusted electrolytic solution was poured through the liquid injection port 9 and sealed with the liquid injection plug 11 to produce a lithium secondary battery.

After initial formation by charging and discharging the produced lithium secondary battery, the battery capacity and the DC resistance (DCR) at each SOC were measured.

A constant voltage-constant current charge (CC-CV charge) was performed at a charge current of 1 CA for a total of 2.5 hours until a battery voltage reached 4.2 V. After pausing for 30 minutes, a constant current discharge (CC discharge) was performed at a discharge current of 0.02 CA up to a battery voltage of 2.9 V to obtain an initial capacity.

As for the relationship between SOC and open circuit voltage (OCV), the battery capacity is discharged from 4.2 V in increment of 5% of the battery capacity, and the relationship with the SOC was obtained by using the voltage after pausing for two hours as the OCV.

As for the DCR with SOC 20%, which is the low SOC region, the CC-CV (CC: constant current, CV: constant voltage) charge was performed with a charge current 1 C from SOC 0% to SOC 20% from the relationship of the SOC-OCV, the discharge was performed for ten seconds at 5 CA, 10 CA, and 15 CA by CC discharge, the difference from the voltage dropped from the OCV in ten seconds and the current value were plotted, and then the DCR was calculated from the slope.

FIG. 6 shows the results of the ratio of Cap.$_b$/Cap.$_a$, the DCR, and the battery capacity of Examples 1 to 6 of the present invention and Comparative Example. Comparative Example 1 and Example 1 of FIG. 6 are the results measured after initial formation, Examples 2 to 6 show the results when the battery capacity and SOC 20% DCR were measured after leaving for 7 days, 15 days, 40 days, 70 days, and 100 days under the environment of SOC 80% and 65° C.

It is found from Table 1 that the SOC 20% DCR is reduced by 26% by changing the ratio of Cap.$_b$/Cap.$_a$ from 12% of Comparative Example to 14% of Example 1. Furthermore, SOC 20% DCR is reduced by 53% (vs. Comparative Example) by increasing the ratio of Cap.$_b$/Cap.$_a$ to 17% of Example 2. From this, SOC 20% DCR, which is the low SOC region, can be reduced by increasing the ratio of Cap.$_b$/Cap.$_a$.

Furthermore, SOC 20% DCR can be reduced by 55% (vs. Comparative Example) and 57% (vs. Comparative Example) by increasing the ratio of Cap.$_b$/Cap.$_a$ to those of Example 3 and Example 4, respectively.

However, in Example 5 and Example 6, the reduction width of SOC 20% DCR tends to be almost saturated to 58%

(vs. Comparative Example), but the battery capacity tends to be reduced. Therefore, there is no need to further increase the ratio of $Cap._b/Cap._a$.

The internal resistance of the secondary battery in the low SOC region can be reduced, without losing the capacity of the secondary battery, by adopting the configuration of the lithium secondary battery as described above. Therefore, since the SOC range of the secondary battery can be expanded, the energy density of the secondary battery can be improved.

The present invention will be briefly summarized. In the secondary battery of the present invention, the capacity difference from the terminal potential of the positive electrode discharge curve to the terminal voltage of the battery discharge curve of the secondary battery with respect to the discharge capacity of the secondary battery is set to 14% to 26%. DCR at SOC 20% can be greatly reduced by adopting such a configuration. As described above, when the capacity difference from the terminal potential of the positive electrode discharge curve to the terminal voltage of the battery discharge curve of the secondary battery with respect to the discharge capacity of the secondary battery becomes larger than 26%, the reduction in DCR is saturated and the battery capacity is decreased, which is not preferable.

In addition, in the secondary battery of the present invention, the capacity difference from the terminal potential of the positive electrode discharge curve to the terminal voltage of the battery discharge curve of the secondary battery with respect to the discharge capacity of the secondary battery is set to 14% to 17%. By adopting such a configuration, the battery capacity can be kept at 95% or more even when compared with Comparative Example, while sufficiently reducing the DCR. It is possible to improve the output characteristics while maximally suppressing the reduction in capacity by increasing the ratio of $Cap._b/Cap._a$.

In addition, in the secondary battery of the present invention, the capacity difference from the terminal potential of the positive electrode discharge curve to the terminal voltage of the battery discharge curve of the secondary battery with respect to the discharge capacity of the secondary battery is set to 17% to 26%. By adopting such a configuration, the DCR can be reduced by 50% or more as compared with Comparative Example, and the output characteristics of the battery can be significantly improved.

In addition, the battery discharge curve and the positive electrode discharge curve of the secondary battery of the present invention have a discharge current of 0.02 CA or less. Since the battery characteristics include little error and are sufficiently reliable, it is preferable that the capacity difference is measured with the discharge current.

In addition, in the present invention, as one method for performing control so as to achieve the capacity difference, various methods can be taken. For example, the negative electrode uses graphite by which a conductive additive is supported as an active material, a mixture of graphite and amorphous carbon is used as an active material, the supported amount of an additive is 2 wt % or less with respect to graphite, and the additive is at least one of carbon black, acetylene black, and ketjen black. That is, any methods can be used without departing from the principle of the present invention described above with reference to FIG. 4 as long as the capacity difference from the terminal potential of the positive electrode discharge curve to the terminal voltage of the battery discharge curve of the secondary battery with respect to the discharge capacity of the secondary battery becomes 14% to 26%.

In addition, in the present invention, the ratio of $Cap._b/Cap._a$ has been focused, but the terminal voltage of the battery discharge curve and the terminal potential of the positive electrode discharge curve can also be focused. In this case, it is preferable that the voltage change rate of the battery discharge curve and the potential change rate of the discharge curve with respect to the change rate of the state of charge (SOC) of the secondary battery are 0.13 or more.

In addition, as a matter of course, it can be seen with a simple capacity difference. In that case, the capacity difference from the terminal potential of the positive electrode discharge curve to the terminal voltage of the battery discharge curve of the secondary battery is preferably 0.82 Ah to 1.28 Ah.

Although the embodiments of the present invention have been described in detail above, the present invention is not limited to the above embodiments, and various design changes can be made without departing from the spirit of the present invention recited in the claims. For example, the embodiments have been described in detail for easy understanding of the present invention and are not intended to limit to those necessarily including all the above-described configurations. In addition, a part of a configuration of a certain embodiment can be replaced with a configuration of another embodiment, and a configuration of another embodiment can be added to a configuration of a certain embodiment. Furthermore, it is possible to add, remove, or replace another configuration with respect to a part of a configuration of each embodiment.

REFERENCE SIGNS LIST 1 battery can
1a opening portion
1b wide side surface
1c narrow side surface
1d bottom surface
2 insulating protective film
3 winding group
6 battery lid
7 insulating plate
9 liquid injection port
10 gas discharge valve
11 liquid injection plug
12 negative external terminal
12a negative electrode connecting portion
14 positive external terminal
14a positive electrode connecting portion
21 negative electrode current collecting plate base portion
22 negative electrode side connection end portion
23 negative electrode side opening hole
24 negative electrode current collecting plate
26 negative electrode side through-hole
32 negative electrode
32a negative electrode foil
32b negative electrode mixture layer
32c negative electrode foil exposed portion
32d negative electrode mixture layer facing positive electrode mixture layer
32e negative electrode mixture layer not facing positive electrode mixture layer
33 separator
34 positive electrode
34a positive electrode foil
34b positive electrode mixture layer
34c positive electrode foil exposed portion
35 separator 41 positive electrode current collecting plate base portion
42 positive electrode side connection end portion
43 positive electrode side opening hole
44 positive electrode current collecting plate
46 positive electrode side through-hole
100 secondary battery

The invention claimed is:

1. A secondary battery comprising:
a positive electrode; and
a negative electrode, wherein
the positive electrode has an internal resistance which yields a discharge current of 0.02 cA, when the positive electrode is discharged from 4.3 V to 2.9 V,
the negative electrode has an internal resistance which yields a discharge current of 0.02 cA, when the negative electrode is discharged from 0.01 V to 1.5 V,
the negative electrode includes graphite via which a conductive additive is supported as an active material,
a supporting amount of the conductive additive is 2 wt % or less with respect to graphite,
the positive electrode has: i) a positive electrode active material mixture on both sides of a positive electrode foil which is a positive electrode current collector, and ii) a positive electrode foil exposed portion to which the electrode active material mixture is not applied, the positive electrode foil exposed portion being provided at an end portion on one side of the positive electrode foil in a width direction thereof, and
the positive electrode active material mixture includes LiMn2O4, LiCoO2, LiNiO2, and LiFePO4, wherein
the positive electrode and the negative electrode are wound together with a separator to form a winding group that is accommodated in a battery can,
the winding group includes the negative electrode and the positive electrode wound into in a flat shape with two separators interposed therebetween, and
an outermost electrode is the negative electrode, and the two separators are further wound on an outside thereof.

2. The secondary battery according to claim 1, wherein a capacity difference from a terminal potential of a positive electrode discharge curve to a terminal voltage of a battery discharge curve of the secondary battery with respect to a discharge capacity of the secondary battery is 14% to 26%.

3. The secondary battery according to claim 1, wherein the capacity difference from the terminal potential of the positive electrode discharge curve to the terminal voltage of the battery discharge curve of the secondary battery with respect to the discharge capacity of the secondary battery is 14% to 17%.

4. The secondary battery according to claim 1, wherein the capacity difference from the terminal potential of the positive electrode discharge curve to the terminal voltage of the battery discharge curve of the secondary battery with respect to the discharge capacity of the secondary battery is 17% to 26%.

5. The secondary battery according to claim 1, wherein the conductive additive includes at least one of carbon black, acetylene black, and ketjen black.

6. The secondary battery according to claim 1, wherein the negative electrode is a mixture of graphite and amorphous carbon.

7. The secondary battery according to claim 1, wherein in the terminal voltage of the battery discharge curve and the terminal potential of the positive electrode discharge curve, a voltage change rate of the battery discharge curve and a potential change rate of the discharge curve with respect to a change rate of a state of charge (SOC) of the secondary battery are 0.13 or more.

8. A secondary battery according to independent claim 1, wherein
a capacity difference from a terminal potential of the positive electrode discharge curve to a terminal voltage of a battery discharge curve of the secondary battery is 0.82 Ah to 1.28 Ah.

9. The secondary battery according to claim 1, wherein a layer composed of an inorganic alumina particles and a binder is provided on both sides of the separators.

10. The secondary battery according to claim 1 wherein a portion of the negative electrode is coated with a negative electrode mixture layer and is wider in a width direction than a portion of the positive electrode that is coated with a positive electrode mixture layer.

* * * * *